(No Model.)

L. GODDU.
NAILING MACHINE.

No. 329,449. Patented Nov. 3, 1885.

Witnesses.
Arthur Zipperlen.
John F. C. Prenkert.

Inventor.
Louis Goddu
by Crosby & Gregory
attys

UNITED STATES PATENT OFFICE.

LOUIS GODDU, OF WINCHESTER, ASSIGNOR JAMES W. BROOKS, TRUSTEE, OF CAMBRIDGE, MASSACHUSETTS.

NAILING-MACHINE.

SPECIFICATION forming part of Letters Patent No. 329,449, dated November 3, 1885.

Application filed August 3, 1885. Serial No. 173,379. (No model.)

*To all whom it may concern:*

Be it known that I, LOUIS GODDU, of Winchester, county of Middlesex, State of Massachusetts, have invented an Improvement in Nailing-Machines, of which the following description, in connection with the accompanying drawings, is a specification, like letters on the drawings representing like parts.

This invention has for its object to provide mechanism whereby headed nails or fastenings may be more accurately and uniformly fed along a raceway and be delivered therefrom under an ordinary driver in position to be driven into the soles of boots and shoes, my invention being an improvement on the class of machine represented in the United States Patent No. 310,816, January 13, 1885.

My invention consists, essentially, in a raceway combined with a reciprocating rake containing one or more prongs, the said rake preferably having imparted to it a rising and falling as well a longitudinal movement, or a movement of reciprocation in a somewhat diagonal direction with relation to the top of the raceway.

Figure 1:
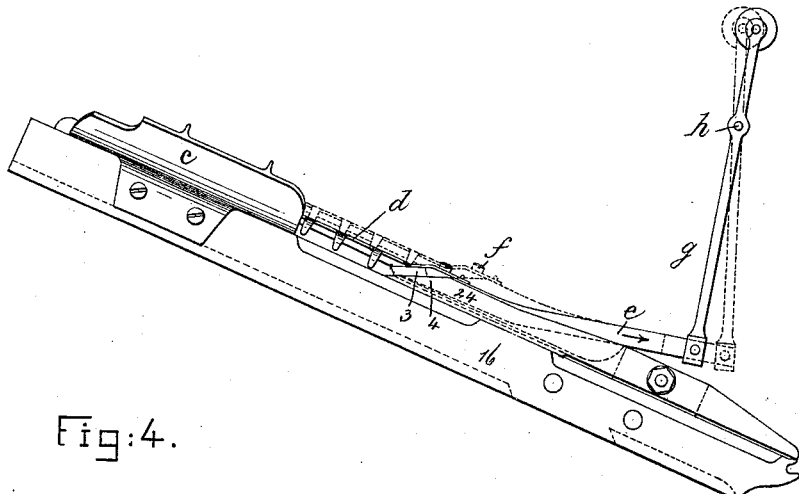
Figure 4:
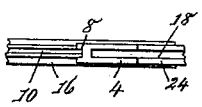
Figure 2:
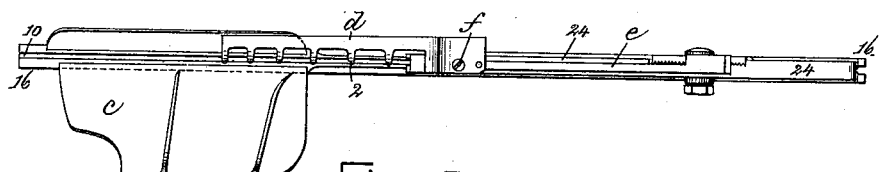
Figure 3:
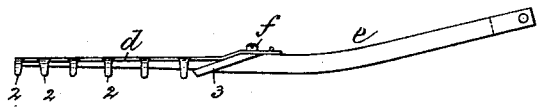

Figure 1 in side elevation represents a sufficient portion of a raceway of a nailing-machine for boot and shoe work, which, in connection with the machine described in the said patent, will enable my invention to be understood and practiced. Fig. 2 is a top or plan view of Fig. 1; Fig. 3, a detail of the rake by itself; and Fig. 4, an enlarged detail, in plan view, of the race-cover at the junction of its upper end with the race.

The raceway 16 and the cover 24 are substantially as in the said patent, the headed nails employed being in practice delivered from the end of the said raceway under and so as to be driven by any usual driver. The loose nails will be dropped or thrown as usual upon the shelf c, and rolling down the inclined top thereof the shanks of some of the nails will enter the slot of the raceway. The headed nails frequently fall and lie crosswise the raceway, and become wedged therein, so that they fail to descend in the raceway. Then, again, the nails become so wedged together that their heads project so far above the top of the raceway that they cannot properly enter the space at the junction of the cover and the raceway. To obviate this difficulty and keep the slot of the raceway full of nails properly suspended by their heads in such manner as to readily pass in succession under the raceway-cover, I have arranged above the raceway a rake, d, herein shown as a metal bar having several prongs, 2, which in practice move in a vertical plane, coinciding with the slot in the raceway.

This rake is attached, as herein shown, to the end of a sliding bar, e, by a screw, f, the said bar at its lower end being jointed to a lever, g, having its fulcrum at or on stud h, held by a fixed part of the head or frame of the nailing-machine with which the said chute is to be employed, the said lever in practice being actuated by a suitable cam or crank. The upper end of the bar e has an inclined lip or projection, 3, which rests upon the inclined end 4 of the cover, as the said bar e slides back and forth in a guide or slot, 18, (see Fig. 4,) in the cover, the said lip as it slides back and forth on the said cover being raised and lowered, thereby giving to the rake a rising movement as the bar is drawn downward in the direction of the arrow, Fig. 1, and a descending movement toward the heads of the nails in the raceway as the bar e is made to travel toward the upper end thereof, such movement of the rake enabling its prongs to act upon all the nails in or on the raceway which are not properly suspended by their heads, pushing said nails and the nails back of or above them in the raceway upward toward the upper end of the raceway, the nails which are laid crosswise being thus knocked off, while the nails the heads of which override or stand above the heads of other nails, are given space to drop freely as the rake moves in the opposite direction. If by any accident an over-riding nail should have its head caught at the shoulder 8, next the upper end of the cover 24, the free end of the bar e in its upward reciprocation along the raceway will act upon and push the said nail upward, so that its head may drop and rest properly on the raceway in position to enter under the cover as the bar e is moved in the reverse direction.

I claim—

1. In a nailing-machine for boot and shoe work, the raceway and its cover under which the heads of the nails pass singly, combined with the reciprocating rake having one or more prongs to act upon the nails lodged upon and not properly suspended in the raceway above the cover, substantially as described.

2. The raceway, its cover, and the reciprocating bar provided with a lip, 3, to co-operate with an incline, 4, above the raceway, combined with a rake attached to the said bar, substantially as described.

In testimony whereof I have signed my name to this specification in the presence of two subscribing witnesses.

LOUIS GODDU.

Witnesses:
G. W. GREGORY,
B. J. NOYES.